(12) United States Patent
Bruckner et al.

(10) Patent No.: US 11,503,013 B2
(45) Date of Patent: Nov. 15, 2022

(54) TRANSLATION OF CLIENT CERTIFICATE AUTHENTICATION INTO AUTHORIZATION GRAPH DESCRIPTORS

(71) Applicant: SAP SE, Walldorf (DE)

(72) Inventors: Thomas Bruckner, Dossenheim (DE); Christopher Schmitz, Mannheim (DE)

(73) Assignee: SAP SE, Walldorf (DE)

( * ) Notice: Subject to any disclaimer, the term of this patent is extended or adjusted under 35 U.S.C. 154(b) by 308 days.

(21) Appl. No.: 16/790,378

(22) Filed: Feb. 13, 2020

(65) Prior Publication Data

US 2021/0258299 A1 Aug. 19, 2021

(51) Int. Cl.
*H04L 9/40* (2022.01)

(52) U.S. Cl.
CPC ........ *H04L 63/0823* (2013.01); *H04L 63/102* (2013.01); *H04L 63/166* (2013.01)

(58) Field of Classification Search
CPC . H04L 63/0823; H04L 63/102; H04L 63/166; H04L 9/006; H04L 9/3263; H04L 63/16; G06F 21/33
See application file for complete search history.

(56) References Cited

U.S. PATENT DOCUMENTS

| | | | | |
|---|---|---|---|---|
| 5,966,127 A * | 10/1999 | Yajima | ................. | G06V 30/422 715/764 |
| 2012/0226998 A1 * | 9/2012 | Friedl | .................... | G06F 9/452 715/760 |
| 2012/0278625 A1 * | 11/2012 | Narayanan | .......... | H04L 63/0823 713/175 |
| 2013/0054567 A1 * | 2/2013 | Graefe | .............. | G06F 16/24542 707/718 |
| 2013/0305392 A1 * | 11/2013 | Bar-El | ................ | H04L 63/0823 726/29 |
| 2014/0380428 A1 * | 12/2014 | Kobayashi | ............ | G06F 21/335 726/4 |
| 2015/0150109 A1 * | 5/2015 | Bocanegra | .......... | H04L 63/0807 726/9 |

(Continued)

OTHER PUBLICATIONS

Thomas Bergwinkl, "LDApp—A JavaScript Linked Data Stack," 2014, pp. 74-79. (Year: 2014).*

(Continued)

*Primary Examiner* — Luu T Pham
*Assistant Examiner* — Canh Le
(74) *Attorney, Agent, or Firm* — Schwegman Lundberg & Woessner, P.A.

(57) ABSTRACT

A cloud computing environment receives a request from a client. The request relates to access of an application executing in the cloud computing environment and it encapsulates a certificate. This certificate is then translated into an authorization graph descriptor which, in turn, is used to traverse a certificate authorization graph to identify a match within a certificate repository. In response to the identification of the match, an access token is requested including the authorization graph descriptor. The access token is then encapsulated in the request which is then forwarded to an authentication service which provides access to the application if there is a match of the authorization graph descriptor against pre-defined authorization requirements. Related apparatus, systems, techniques and articles are also described.

20 Claims, 4 Drawing Sheets

(56) References Cited

U.S. PATENT DOCUMENTS

2015/0281011 A1* 10/2015 Gates ................... H04L 41/065
                                                     709/224
2017/0195332 A1*  7/2017 Wu ...................... G06Q 10/06
2017/0212930 A1*  7/2017 Carter ................. G06F 16/9024
2019/0311065 A1* 10/2019 Brass .................. G06F 16/3344
2021/0021585 A1*  1/2021 Rahman ............... H04L 61/255

OTHER PUBLICATIONS

Mohammed A. Alnatheer, Secure Socket Layer (SSL) Impact on Web Server Performance, 2014, pp. 211-217. (Year: 2014).*

* cited by examiner

TRANSLATION OF CLIENT CERTIFICATE AUTHENTICATION INTO AUTHORIZATION GRAPH DESCRIPTORS

TECHNICAL FIELD

The subject matter described herein relates to techniques for providing enhanced interoperability among heterogeneous software application by translating client certificate authentication into authorization graph descriptors.

BACKGROUND

OAuth2 is an authorization framework that enables applications to obtain limited access to user accounts on an HTTP service. In particular, OAuth2 is often used in business cloud applications relying on JSON Web Tokens (JWT) as access tokens and descriptor for authorization claims. Cloud environments can provide a User Account and Authentication (UAA) service, which enables redirect based SSO authentication with trusted Identity Providers (IDP) for end-user sessions and support for OAuth2 flows such as client credential flow consisting of two separate HTTP requests for technical clients. The JWT/Bearer tokens signed by the UAA are the single source of truth regarding authorization claims to be checked in a business application and provide trusted tenant information for multitenancy-enabled applications.

With some cloud environments, authentication is performed on the application layer using the authorization-header field of HTTP requests. For some scenarios, this arrangement is not always sufficient. For example, there can be arrangements in which a subset of technical clients are not able to integrate with the offered application because they do not support technical OAuth2 flows or generally round-trip based authentication. Further, security critical resources exposed by the application may require verification of the origin identity of requests from external clients on a deeper networking level. With the round trip based token flows described above, it cannot be guaranteed that the technical client is indeed the desired person. Moreover, in time-critical and performance-oriented use cases client authentication based on the Transport Level Security (TLS) layer is preferable in comparison to additional HTTP requests. As a layer closer to the network transport layers is preferable, Mutual TLS (Client Certificate Authentication) is often a desired approach for the authentication of technical clients in a business application.

One difficulty with such an arrangement is that client Certificates (X.509) are non-stable objects, not necessarily known to compile time, subject of changes and revocations during runtime and thus are not suitable as direct authorization descriptors.

SUMMARY

In a first aspect, a cloud computing environment receives a request from a client. The request relates to access of an application executing in the cloud computing environment and it encapsulates a certificate. This certificate is then translated into an authorization graph descriptor which, in turn, is used to traverse a certificate authorization graph to identify a match within a certificate repository. In response to the identification of the match, an access token is requested including the authorization graph descriptor. The access token is then encapsulated in the request which is then forwarded to an authentication service which provides access to the application if there is a match of the authorization graph descriptor against pre-defined authorization requirements.

The certificate can take various forms including an X.509 client certificate.

The request can, as an example, be on the Transport Level Security (TLS) layer.

The translating can include constructing a runtime object as a rooted directed graph to translate the certificate into an abstract representation.

A copy of the token can be cached in a certificate authorization component. The received request can be enhanced with the cached copy of the token and proxied to an endpoint executing desired business logic. The token can be an abstraction of the authorization requirement for use by the business logic executing on the endpoint.

The authorization graph descriptor can be characterized as an abstract, hierarchical and stable authorization identifier for a single leaf node of the certificate authorization graph to be matched against authorization requirements for incoming requests.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter enables client devices to interact with a remote cloud-based application without requiring additional requests (network traffic, etc.) as compared to conventional techniques. In addition, the current subject matter is advantageous in that the consuming client can be identified on the transport layer security (TLS) level to ensure a certain level of integrity between the client and the request. Moreover, the current subject matter hides the complexity of client certificate trust relationships from the business cloud application and improves performance for technical clients serving multiple tenants with the same or different client certificates. Further, the current subject matter enables clients which are not capable of OAuth2 flows to integrate with certain business applications executing in a cloud environment (which they would not otherwise be able to integrate with).

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter can be used to integrate external technical clients (i.e., computing devices or web-services, etc.) into a cloud business application executing in a cloud environment in which the authentication of the client using client certificates (X.509) on TLS Level (Mutual TLS) is offered additionally to OAuth2 as it is either desired by one of the clients involved (to provide increased system security) or even required.

With the current subject matter, client certificates of incoming requests can be mapped against a data-structure of trusted certificates calculated during the runtime of the application. The certificates can then be translated into abstract hierarchical authorization descriptions which can be checked against defined and stable authorization requirements. This arrangement brings the advantage of abstracting the complexity of the actual certificates into stable and robust descriptors that the application can rely on: a) already during development/deployment time when certificate details are not known yet b) even on events during runtime like revocations. To achieve such an arrangement, the procedures provided herein can use various artifacts including a certificate repository, a path descriptor, and authorization requirements.

The certificate repository can be a rooted directed graph, constructed as a runtime object, to translate client certificates (X.509) into an abstract representation. The graph can include a root representing the business application. The actual client certificates can be represented by nodes that do not have descendants (leaf nodes). Between the root and the leaf nodes there can be a defined number of intermediate node layers, where each layer can comprise 1-n parallel nodes as instances of a layer type. The layers can define a quantitative relationship to each other. Leaf nodes can be introduced into the graph from building 1-m paths from the root to the inserted leaf node (runtime configuration).

Figure 1:
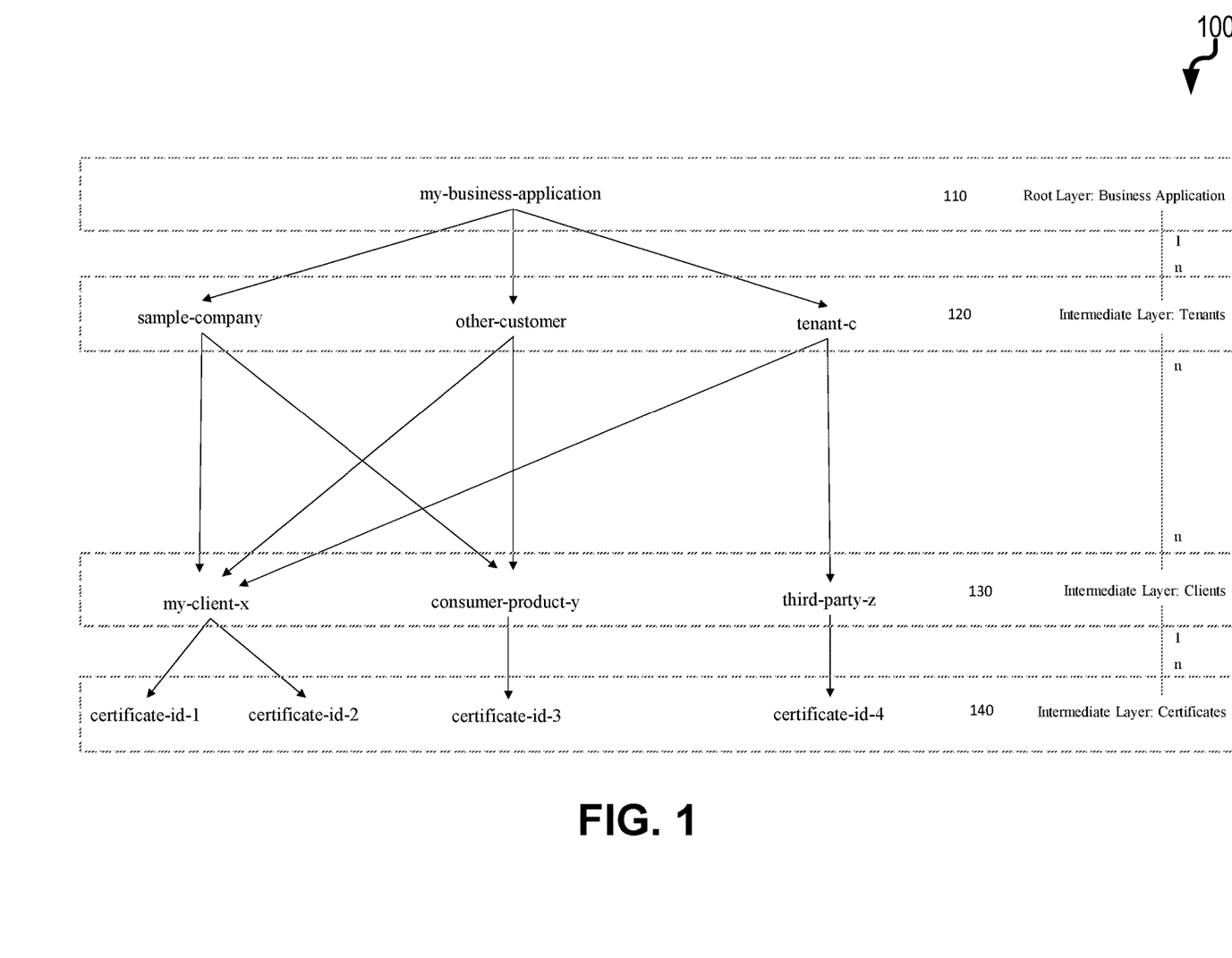
FIG. 1 is a diagram illustrating a certificate repository.

FIG. 1 shows an example certificate repository having two intermediate layers 120 (tenants), 130 (clients) filled with sample certificates and respective paths residing between the business application 110 and a certificates layer 140.

The path descriptor is an abstract, hierarchical and stable authorization identifier for a single leaf node to be matched against authorization requirements on incoming requests. Path descriptors can introduce two symbols to be able to describe leaf nodes with multiple paths:

*: The Descriptor-Wildcard to map to all values in a layer
**: The Value Split to map multiple values in a layer The certificates inside the example graph in FIG. 1 can lead to the following path descriptors:

my-business-application.*.my-client-x.certificate-1
my-business-application.*.my-client-x.certificate-2
my-business-application.sample-company|other-customer.consumer-product-y.certificate-3
my-business-application.tenant-c.third-party-z.certificate-4

The authorization requirements can describe abstract expectations against incoming requests containing the counter part of path descriptor information. The authorization requirements can introduce two symbols to describe special requirements per layer:

*: The Soft Wildcard accept all values on this level
**: The Strict Wildcard to explicitly require a Descriptor-Wildcard Similar to path descriptors, authorization requirements can describe the requirements per layer from higher layers (root) to lower layers (leaves), separated by dots. Authorization requirements layers can be omitted, if no expectation is present in this and the following lower layers (same as soft wildcards).

Authorization Requirement Examples

| Authorization Requirement | Full form | Description |
| --- | --- | --- |
| my-business-application | my-business-application.*.*.* | Allowing all certificates trusted by the business application |
| my-business-application.tenant-c | my-business-application.tenant-c.*.* | Allowing all certificates having a path to the tenant |
| my-business-application.*.my-client-x | my-business-application.*.my-client-x.* | Allowing all certificates from the client specified |
| my-business-application..my-client-x | my-business-application..my-client-x.* | Allowing all certificates from the client specified, if the client is trusted by all tenants |

Figure 2:
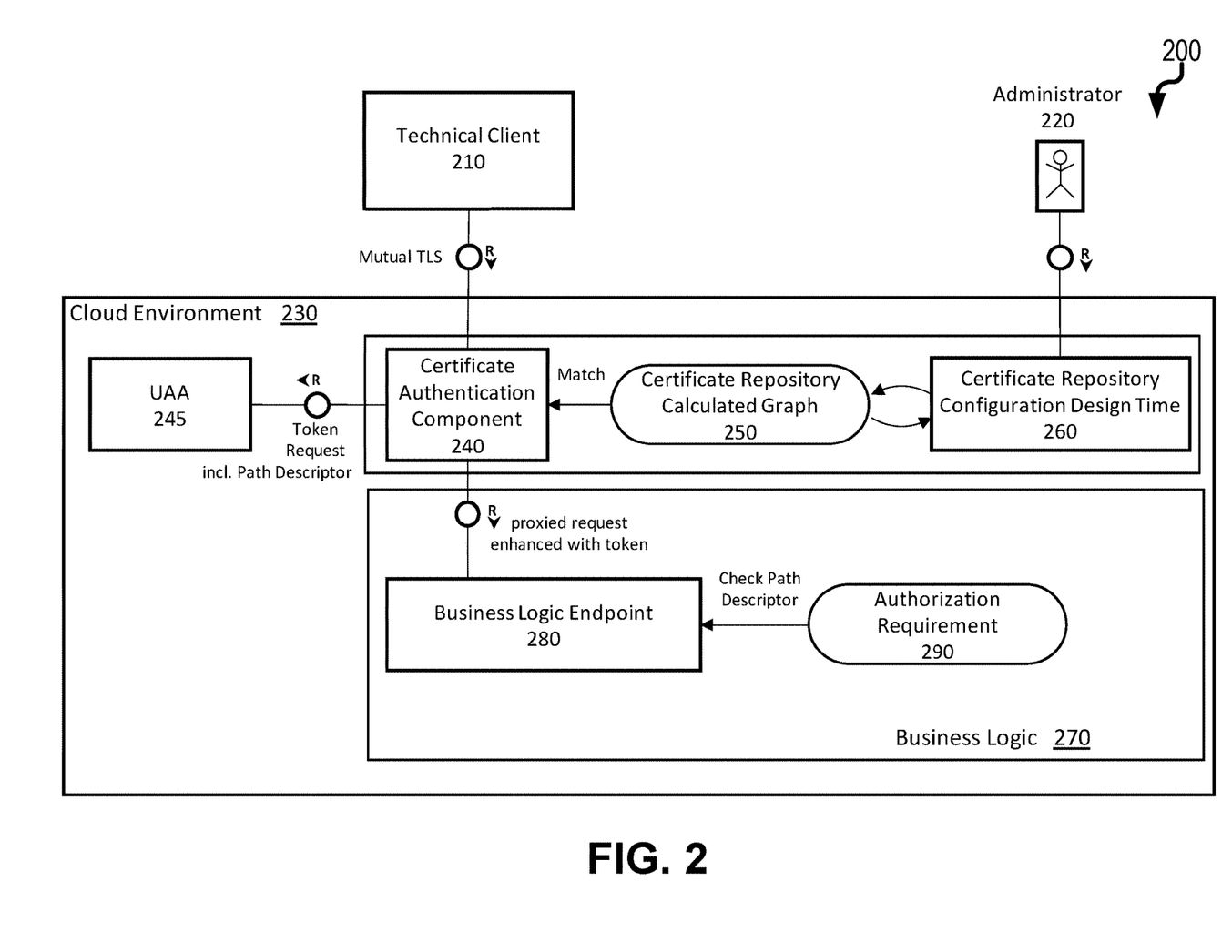
FIG. 2 is a sample architecture for translating a client certificate authentications into authorization graph descriptors.

FIG. 2 is a diagram 200 illustrating an architecture in which a technical client 210 (e.g., a computing device, etc.) interacts with a cloud environment 230 executing one or more business instances. Practically using these structured artifacts, requests to the cloud environment 230 originating from the technical client 210 containing a client certificate on a TLS level (e.g., Mutual TLS, etc.) can be translated into authorization graph descriptors (path descriptor) by a certificate authentication component 240 in the cloud business application acting as the entry point for requests with certificate-based authentication. The certificate authentication component 240 is the point, where the actual mutual TLS connections are getting terminated using the list of trusted certification authorities (CAs). On an incoming trusted connection, the certificate is extracted and mapped against the graph 250 to get the path descriptor out of it (counterpart of 290). On a positive match, the certificate authentication component 240 can request (and, optionally, cache for performance reasons) a JWT (JSON web token) based access token including the path descriptor in the token request as an additional attribute to be included in the signed token. The token request is forwarded with the token (in most cases proxied) to a responsible endpoint (e.g., User Account and Authentication (UAA) service 245) which matches the included path descriptor against defined access requirements (authorization requirements 290). After the comparison, access to the business application can be permitted or denied.

If a certificate in the certificate repository needs to change during runtime, for example due to expiration/renewal, invalidation or necessary changes on the client side. The certificate repository with its calculate graph 250 can be updated inserting the new certificate using the same paths as before. This leads to the fact, that the path descriptor either does not change at all or only on the lowest level of the certificate ID. Thus, any authorization requirements expecting values on any level from the root layer down to the last intermediate layer (technical clients 210, etc.) will still correctly match and no configuration on the components 280, 290 forming part of the business logic 270 needs to change, which highly reduces configuration complexity.

The business application/business logic (280) can be developed and deployed without the need to know details about the actual certificates expected during runtime. Only the abstract authorization requirements are put as requirements on the endpoint: for example endpoint A only allows communication with technical clients of trust group xyz (using the authorization requirement notation component 290). This arrangement means that the business logic is abstracted from complexity which the business logic does not need to know.

A certificate repository configuration design time component 260 is the administrative offering (accessible by an administrator 220) to manage trusted certificates and assign them a logical trust meaning. The trust clusters and paths they belong lead to a semantic mapping. Out of these assignments, the runtime artifact like the certificate repository calculated graph 250 can be generated representing the current trust state. This arrangement enables the ability to react on events during run time of the application without the need to adapt the trust settings. For example, if a client is getting hacked, the trust to its certificate need to be removed/revoked and potentially replaced. Another example is when new clients join sematic clusters. This arrangement makes the current system stable as changes can be reflected to the system without any redeployment or code change.

From the UAA 245 a token containing the abstract descriptor (path descriptor) is requested and eventually cached in the certificate authentication component 240 for performance reasons. The initial request from 210 to 240 is now enhanced with this access token described above and then proxied to the endpoint performing the business logic 280.

Figure 3:
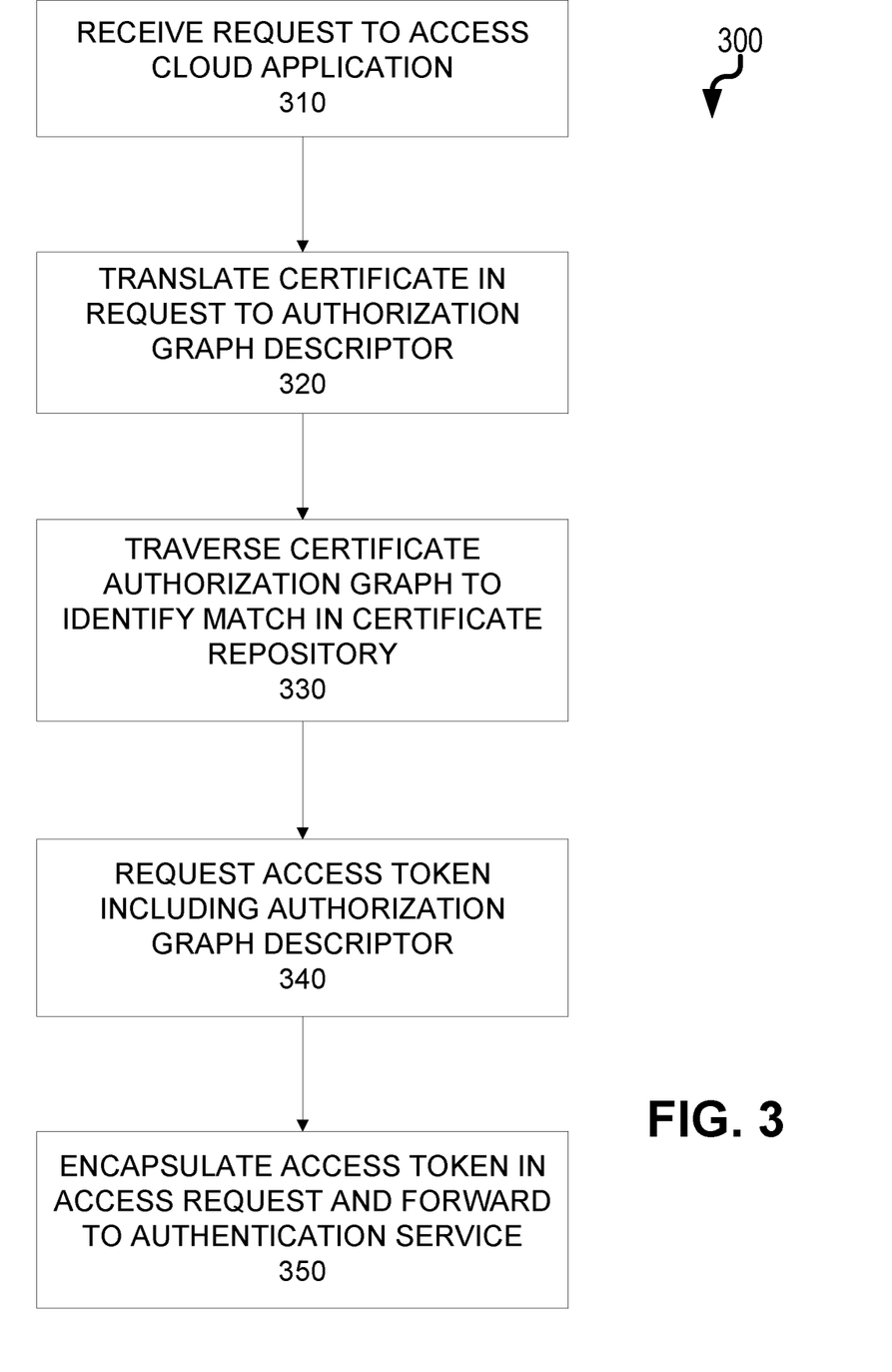
FIG. 3 is a process flow diagram for translating a client certificate authentications into authorization graph descriptors.

FIG. 3 is a process flow diagram 300 in which, at 310, a request originating from a client computing device is received by a cloud computing environment. The request encapsulates a certificate and seeks access to an application executing in the cloud computing environment. Thereafter, at 320, the certificate is translated into an authorization graph descriptor. A certificate authorization graph is traversed, at 330, using the authorization graph descriptor to identify a match within a certificate repository. In response to the identification of the match, an access token is requested, at 340 which includes the authorization graph descriptor. Next, at 350, the access token is then encapsulated in the incoming request which is now forwarded to the business application endpoint which provides access to the application if there is a match of the authorization graph descriptor against pre-defined authorization requirements.

Figure 4:
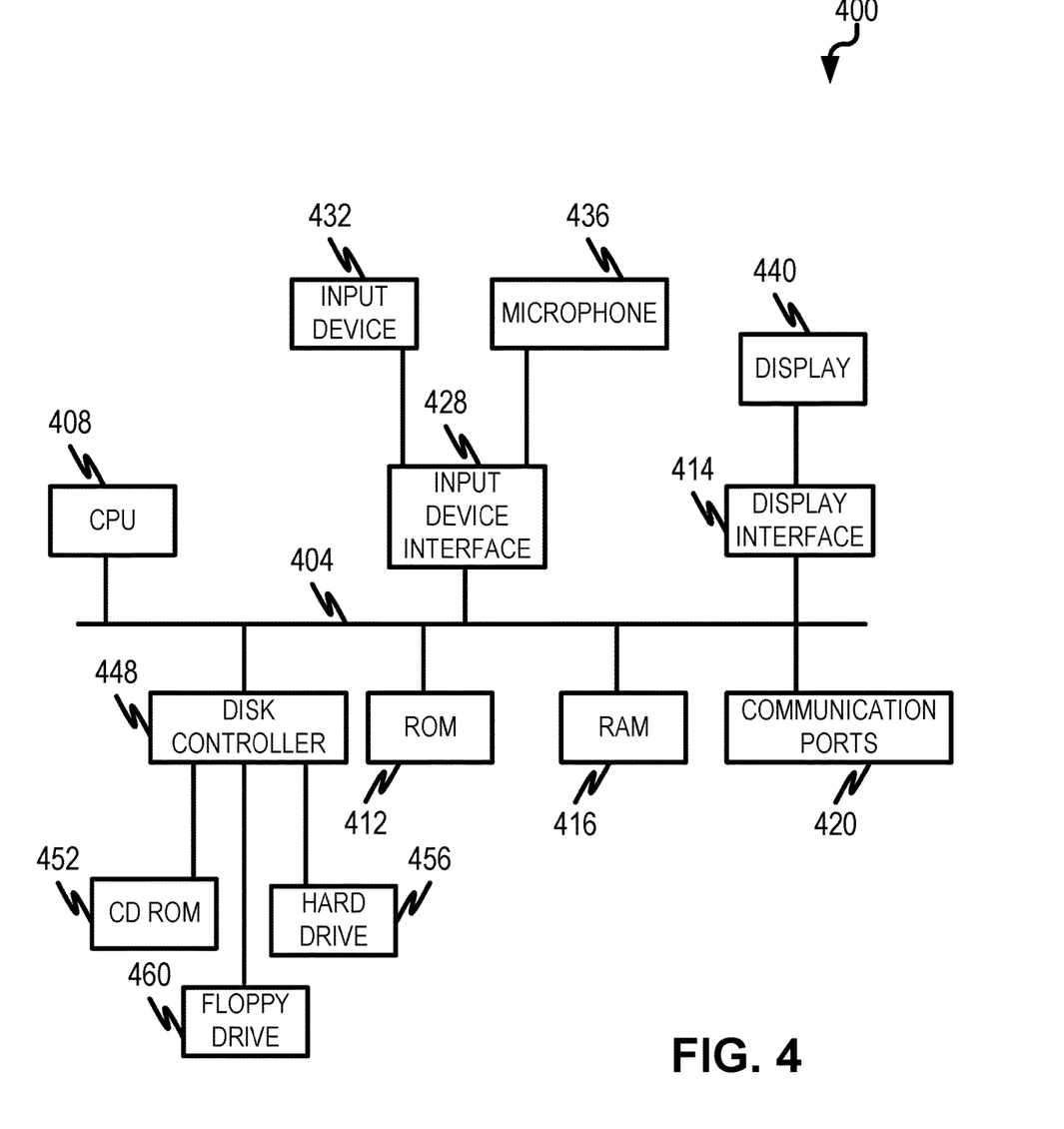
FIG. 4 is a diagram illustrating a computing device for implementing aspects of the current subject matter.

FIG. 4 is a diagram 400 illustrating a sample computing device architecture for implementing various aspects described herein. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface with one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the at least one communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 via a display interface 414 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. The input device 432 and the microphone 436 can be coupled to and convey information via the bus 404 by way of an input device interface 428. Other computing devices, such as dedicated servers, can omit one or more of the display 440 and display interface 414, the input device 432, the microphone 436, and input device interface 428.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
   receiving, by a cloud computing environment from a client, a request to access an application executing in the cloud computing environment, the request encapsulating an X.509 certificate;
   translating the X.509 certificate into an authorization graph descriptor, wherein the authorization graph descriptor is an abstract, hierarchical and stable authorization identifier for a single leaf node of a certificate authorization graph to be matched against authorization requirements for incoming requests;
   traversing the certificate authorization graph using the authorization graph descriptor to identify a match within a certificate repository;
   requesting, in response to the identification of the match, an access token including the authorization graph descriptor; and
   encapsulating the access token in the request and forwarding the request to an authentication service which provides access to the application if there is a match of the authorization graph descriptor against pre-defined authorization requirements.

2. The method of claim 1, wherein the request is on a Transport Level Security (TLS) layer.

3. The method of claim 1, wherein the translating comprises: constructing a runtime object as a rooted directed graph to translate the certificate into an abstract representation.

4. The method of claim 1 further comprising: caching a copy of the access token in a certificate authorization component.

5. The method of claim 4, wherein the received request is enhanced with the cached copy of the access token and proxied to an endpoint executing business logic.

6. The method of claim 5, wherein the access token comprises an abstraction of the pre-defined authorization requirements for use by the business logic executing on the endpoint.

7. A system comprising:
   at least one data processor; and
   memory storing instructions which, when executed by the at least one data processor, result in operations comprising:
   receiving, by a cloud computing environment from a client, a request to access an application executing in the cloud computing environment, the request encapsulating an X.509 certificate;
   translating the X.509 certificate into an authorization graph descriptor, wherein the authorization graph descriptor is an abstract, hierarchical and stable authorization identifier for a single leaf node of a certificate authorization graph to be matched against authorization requirements for incoming requests;
   traversing the certificate authorization graph using the authorization graph descriptor to identify a match within a certificate repository;
   requesting, in response to the identification of the match, an access token including the authorization graph descriptor; and
   encapsulating the access token in the request and forwarding the request to an authentication service which provides access to the application if there is a match of the authorization graph descriptor against pre-defined authorization requirements.

8. The system of claim 7, wherein the request is on a Transport Level Security (TLS) layer.

9. The system of claim 7, wherein the translating comprises: constructing a runtime object as a rooted directed graph to translate the certificate into an abstract representation.

10. The system of claim 9, wherein the operations further comprise:
caching a copy of the access token in a certificate authorization component.

11. The system of claim 10, wherein the received request is enhanced with the cached copy of the access token and proxied to an endpoint executing business logic.

12. The system of claim 11, wherein the access token comprises an abstraction of the pre-defined authorization requirements for use by the business logic executing on the endpoint.

13. The system of claim 7, wherein the certificate authorization graph comprises a root layer corresponding to the application.

14. The system of claim 7, wherein the certificate authorization graph comprises an intermediate layer with nodes corresponding to a plurality of tenants.

15. A non-transitory computer program product storing instructions which, when executed by at least one computing device, result in operations comprising:
receiving, by a cloud computing environment from a client, a request to access an application executing in the cloud computing environment, the request encapsulating an X.509 certificate;
translating the X.509 certificate into an authorization graph descriptor, wherein the authorization graph descriptor is an abstract, hierarchical and stable authorization identifier for a single leaf node of a certificate authorization graph to be matched against authorization requirements for incoming requests;
traversing the certificate authorization graph using the authorization graph descriptor to identify a match within a certificate repository;
requesting, in response to the identification of the match, an access token including the authorization graph descriptor; and
encapsulating the access token in the request and forwarding the request to an authentication service which provides access to the application if there is a match of the authorization graph descriptor against pre-defined authorization requirements.

16. The non-transitory computer program product of claim 15, wherein the operations further comprise:
constructing a runtime object as a rooted directed graph to translate the certificate into an abstract representation; and
caching a copy of the access token in a certificate authorization component.

17. The non-transitory computer program product of claim 16, wherein the received request is enhanced with the cached copy of the access token and proxied to an endpoint executing business logic.

18. The non-transitory computer program product of claim 15, wherein the certificate authorization graph comprises a root layer corresponding to the application.

19. The non-transitory computer program product of claim 15, wherein the certificate authorization graph comprises an intermediate layer with nodes corresponding to a plurality of tenants.

20. The non-transitory computer program product of claim 19, wherein the certificate authorization graph comprises a second intermediate layer with nodes corresponding to a plurality of clients.

* * * * *